United States Patent [19]
Holst et al.

[11] Patent Number: 5,533,890
[45] Date of Patent: Jul. 9, 1996

[54] METHOD AND APPARATUS FOR CONTROL OF FUGITIVE VOC EMISSIONS

[75] Inventors: Mark R. Holst, Concord; Richard J. Martin, Sunnyvale; John D. Stilger, San Jose; Samson C. Yee, Fremont, all of Calif.

[73] Assignee: Thermatrix, Inc., San Jose, Calif.

[21] Appl. No.: 393,023

[22] Filed: Feb. 23, 1995

Related U.S. Application Data

[63] Continuation of Ser. No. 992,405, Dec. 17, 1992, abandoned.

[51] Int. Cl.⁶ .................................................. F23D 3/40
[52] U.S. Cl. ................... 431/5; 431/7; 431/170; 422/177
[58] Field of Search ........................ 431/5, 7, 170, 431/202; 422/177

[56] References Cited

U.S. PATENT DOCUMENTS

| | | | |
|---|---|---|---|
| 2,537,091 | 1/1951 | Rodman et al. | 158/115 |
| 2,610,411 | 9/1952 | Steese | 34/35 |
| 2,656,008 | 10/1953 | Engel | 183/6 |
| 3,251,656 | 5/1966 | Edwards | 23/277 |
| 3,706,445 | 12/1972 | Gentry | 263/8 R |
| 3,881,874 | 5/1975 | Shular et al. | 23/277 C |
| 3,895,918 | 7/1975 | Mueller | 23/277 C |
| 3,900,554 | 8/1975 | Lyon | 423/235 |
| 3,999,936 | 12/1976 | Hasselmann | 431/202 |
| 4,058,147 | 11/1977 | Stary et al. | 141/45 |
| 4,095,934 | 6/1978 | Jensen et al. | 431/202 X |
| 4,134,271 | 1/1979 | Datis | 62/54 |
| 4,176,162 | 11/1979 | Stern | 423/210 |
| 4,468,193 | 8/1984 | Lawrence et al. | 431/202 |
| 4,643,667 | 2/1987 | Fleming | 431/7 |
| 4,688,495 | 8/1987 | Galloway | 110/250 |
| 4,722,662 | 2/1988 | Morgan | 415/168 |
| 4,823,711 | 4/1989 | Kroneberger et al. | 110/236 |
| 4,895,085 | 1/1990 | Chips | 431/202 X |
| 4,900,244 | 2/1990 | Keller et al. | 431/5 |
| 4,907,965 | 3/1990 | Howarth et al. | 431/202 |
| 4,951,743 | 8/1990 | Henderson | 166/84 |
| 4,953,512 | 9/1990 | Italiano | 431/170 X |
| 4,983,364 | 1/1991 | Buck et al. | 431/5 X |
| 5,050,603 | 9/1991 | Stokes et al. | 123/523 |
| 5,165,884 | 11/1992 | Martin et al. | 431/7 |
| 5,188,804 | 2/1993 | Pace et al. | 431/5 X |
| 5,203,370 | 4/1993 | Block et al. | 137/312 |
| 5,215,075 | 6/1993 | Caridis et al. | 126/300 |
| 5,277,545 | 1/1994 | DeLange | 415/168.1 |
| 5,291,859 | 3/1994 | Brinck et al. | |
| 5,295,448 | 3/1994 | Vickery | 110/214 |
| 5,320,518 | 6/1994 | Stilger | 431/7 |
| 5,344,313 | 9/1994 | Johnsen, Jr. | 431/346 |

*Primary Examiner*—Carl D. Price
*Attorney, Agent, or Firm*—Woodcock Washburn Kurtz Mackiewicz & Norris

[57] ABSTRACT

An apparatus and method for the monitoring and abatement of fugitive VOC emissions is disclosed. Suction, generated by a fume pump or a venturi type ejector, pulls air and VOC's from one or more sources of VOC emissions such as the mechanical seals of pumps or compressors. These VOC fumes are collected, separated from any liquids in a knock-out pot, and directed to a flameless combustor/thermal oxidizer comprising a tube packed with heat resistant material and surrounded by an electric heater and thermal insulation. This matrix bed of heat resistant materials is heated to a temperature sufficient to oxidize/destroy the VOC emissions. Thereafter, an optional convective quench section may be used to lower the temperature of the exhaust gases prior to their release to the atmosphere. By monitoring the temperature and/or the amount of power needed, changes in VOC emissions can be detected.

46 Claims, 2 Drawing Sheets

METHOD AND APPARATUS FOR CONTROL OF FUGITIVE VOC EMISSIONS

This is a continuation of application Ser. No. 07/992,405, filed Dec. 17, 1992 abandoned.

FIELD OF THE INVENTION

The field of the present invention is methods and apparatuses for the abatement of fugitive VOC emissions. In particular, the present invention relates to an apparatus and method for controlled exothermic reaction of fugitive VOC emissions from pumps, compressors, valves, etc., although it will be appreciated that the invention in its broader application can be applied to any commercial process giving off organic vapors.

BACKGROUND OF THE INVENTION

One of the most persistent and widespread air pollution problems facing the United States and other countries is the level of smog in urban communities. Over 100 million citizens in the U.S. live in cities that are exceeding the national ambient air-quality standards (NAAQS) for ozone, the major cause of smog. Ozone, which is produced when volatile organic compounds (VOC) and nitrogen oxides react in the presence of sunlight, is one of the major items addressed by the U.S. Congress through its enactment of the Clean Air Act (CAA) Amendments of 1990.

The CAA provides a mechanism for understanding and categorizing the U.S. air pollution concerns and for developing acceptable solutions for industry and the general public. As a major objective, the CAA has a goal to reduce the level of ground ozone by 15% in polluted areas over the next six years. This reduction in the level of ground ozone is provided by a comprehensive plan for achieving significant reductions in VOC emissions. Title III of the CAA will bring the number of toxic chemicals to be controlled from 7 to 189, and it aims for 90% reduction of such chemicals by the year 2000.

The sources of VOC are numerous. VOC are emitted from automobiles, petroleum refineries, chemical plants, dry cleaners, gas stations, and industrial facilities, among others. In 1989, in the U.S., 22,569 facilities reported to the Toxic Release Inventory (TRI) as part of the Superfund Amendment and Reauthorization Act (SARA) Title 3 program. The TRI database for 1989 totaled over 2.45 billion pounds of VOC released into the atmosphere. Of this total air toxics release, nearly one third derived from fugitive emissions (i.e., emissions not identified with a particular exhaust vent).

Fugitive VOC emissions are not released from a stack or process vent, but rather, escape from the seals of pumps, compressors, and valves, and from area sources such as wastewater treatment plants, retention ponds, and land treatment facilities. Even though the amount of VOC typically released from an individual fugitive source can be low, the large number of fugitive emission sources in the U.S. make this an important environmental concern.

A large fraction of fugitive VOC emissions can be traced to hydrocarbon liquid pumps at refineries and chemical plants. Mechanical seals on the rotating pump shafts will leak some VOC, even if brand new, and their performance degrades over the life of the seals, which is typically 2 years or less.

The U.S. Environmental Protection Agency (EPA) regulates fugitive emissions from process pumps and compressors in VOC service. The EPA Regulation 40 C.F.R. §60 Subpart VV (SOCMI) & Subpart GGG (Refinery) (formally delegated to the states and districts) requires compliance from affected facilities. This regulation defines a leak (an instrument reading exceeding 10,000 ppmV at 1 cm from the seal), stipulates acceptable repair methods and timing, and lays down a guideline for monitoring individual pump seals. In accordance with the regulation, seals and pumps must be repaired or replaced within 15 days of any leak detection.

However, partly because of the CAA Amendments and partly because of local public demand, today it is the states and, in many cases, the regional offices that are leading the charge for tougher regulations on fugitives emissions. In California, the South Coast Air Quality Management District (SCAQMD) has issued a new regulation, Rule Number 1173, which has begun to severely restrict the leakage from pumps at chemical and petrochemical facilities. A critical aspect of Rule 1173 is the change in the maximum allowable instrument reading (MAIR) for VOC leakage from 10,000 ppmV to 1,000 ppmV. Rule 1173 also requires daily, as opposed to weekly, visual inspections of every process pump. Additionally, the rule states that any component or replacement part shall be replaced with BACT or BART (Best Available Control/Retrofit Technology), or vented to an air pollution control device that must meet BACT standards.

In March, 1992, the Bay Area Air Quality Management District (BAAQMD) formally adopted revisions to Regulation 8, Rule 25, which regulates pump and compressor seals at petroleum refineries and chemical plants in the San Francisco Bay area. This rule, first adopted in July, 1980, was revised to meet the new air quality standards and promises to be at least as restrictive as Rule 1173. Effective January, 1993, the MAIR will be reduced to 10,000 ppmV and it will be further reduced to 500 ppmV within a few years.

The cost for compliance with the new standards will be expensive. It is estimated that the capital cost to retrofit all existing pumps with a dual mechanical seal system for the refining market sector only, excluding the marketing, production, and transportation sectors, is $1.1 billion. Operating costs to repair these seals will run over $90 million annually. As the regulations push for better process control of fugitive emissions, there is a need for more cost effective, long term solutions.

The industrial practice for controlling leakage of hazardous and potentially dangerous organic compounds from process pumps is either to replace the pump seal or to purchase a sealless pump. In some instances, a petrochemical facility will collect and vent the emissions from a number of pumps to a central air pollution control device. Each solution has serious trade-offs, including performance losses and costs for installation and maintenance.

Seals

Seals differ in style and design based on the required performance and the type of pump application. Generally, seals can be categorized as either single or dual mechanical seals. Performance of a particular seal varies based on its environment and age. The following data reflects typical expected initial seal performance:

| Seal Type | VOC leakage ppm V level |
| --- | --- |
| Single Mechanical Seal | 1500 |
| Dual Mechanical Seal | 500 |
| Dual Mechanical Seal | 50 (top end) |

-continued

| Seal Type | VOC leakage ppm V level |
|---|---|
| (w/barrier fluid) | |

A drawback for pumps with conventional seals is that they are often high maintenance and repair items. Seals normally are designed to last two years, but frequently are changed annually because of improper operation or unusual organic loading. Also, because of the tightening regulations, seals that had been commercially acceptable are now deemed to fail prematurely. The capital cost for replacing pumps' single mechanical seals, as well as the bearings and other standard repair parts, can be as high as $5,000 per pump. On an installed cost basis, this cost can exceed $15,000 per pump.

Dual mechanical seals have been used by industry as an effective means to curb fugitive emissions. Dual mechanical seals are more expensive than single mechanical seals, sometimes costing four to five times as much. The dual mechanical design traps an inert fluid between the outboard and inboard shaft seals, so that, if a leak occurs, it is the barrier fluid and not the process organic compound that escapes to the atmosphere. The barrier fluid, therefore, needs to be classified benign for process operations and still not be a restricted VOC. Because of the increasing number of regulated VOC under the CAA Amendments, industry is finding it more and more difficult to locate a barrier fluid that itself is not a hazardous compound.

Sealless Pumps

Magnetic drive centrifugal pumps are designed to be leak-free by eliminating the seals in a conventional pump system. The driveshaft is connected to the pump impeller through magnetic couplings located adjacent to the inner and outer walls. A thin, metal containment can is used to completely isolate the pumped fluid and, consequently, prevents the process fluid from releasing to the atmosphere.

Magnetic drive pumps have been available for years. However, their use has been limited to specialized and lower capacity applications, generally below 200 horsepower, because of power requirements and the cost associated with large magnetic materials. Sealless pumps currently can cost 3 to 4 times more than conventional pumps with mechanical seals.

A major drawback for sealless pumps is their mechanical inefficiency. Magnetically driven pumps lose up to 5–15% of the power supplied because of eddy currents in the containment shell. Additionally, sealless pumps are less forgiving of solids or high temperatures in the process fluid.

VOC Destruction

Another alternative is to apply suction to the housing of a single mechanical seal and transmit the resulting air/VOC mixture to a destruction or removal device. This option is typically exercised if fumes from several pumps can be manifolded together and admitted to a central control device. The central device can be either a thermal destruction system or an absorbent-based removal system. Typically, the cost for piping, fire safeguarding, and fume monitoring can double the cost (on a per unit basis) of the seal itself. Often, the piping contains additional flanges and valves that may become sources of fugitive emissions themselves.

Alternative methods for removing VOC's from various sources of VOC's have been reported in the art but each of them suffers from problems, such as the use of a flame. For example, U.S. Pat. No. 4,983,364 (Buck et al.) describes a thermal/catalytic combustor for oxidation of VOC's in air to be used in the remedial cleanup of ground sites contaminated by spills or leaks of gasoline, organic paint solvents, and the like in conjunction with a process known as air extraction. In this method, two different parallel systems are required: either direct oxidation with a flamed incinerator when VOC concentrations are high, or a catalytic oxidizer when VOC concentrations are low. The invention revolves around the ability to switch from one mode to another for fuel conservation purposes. Further, Buck et al. call for the addition of enrichment fuel to the combustor when the VOC concentration falls below the level necessary to keep the combustion self-sustaining.

U.S. Pat. No. 4,176,162 (Stern) discloses a method and apparatus for removing solvents evaporated from ink solutions in the drying section of a multi-station printing press by heating the evaporated solvents in an oxidation chamber. The disclosed system is of the regenerative type, which requires the use of at least two beds, and also requires a pilot flame in the residence time chamber. In such regenerative systems, the VOC stream is fed through one preheated bed prior to entering the combustion chamber and then is passed through a second bed after combustion that recovers the heat from the exhaust of the gas stream. Subsequently, the process is reversed such that the now-heated second bed is used to preheat the VOC stream and the first bed removes heat from the exhaust stream. In addition, Buck et al. discloses that the use of a bypass is provided to circumvent one of the beds and go directly to the combustion chamber in the event of overly VOC-rich fumes.

U.S. Pat. No. 3,895,918 (Mueller) describes a standard style of a regenerative system wherein several beds are placed around a single, central silo-style combustion chamber. The combustion chamber is also furnished with a plurality of burners to generate heat within the chamber itself.

Finally, U.S. Pat. No. 3,881,874 (Shular et al.) describes a regenerative incineration system that utilizes a single housing for both of the two disclosed beds, requires no retention means for the beds since they are comprised of free-standing fire brick, and utilizes a damper design that reduces the number of valves required. The combustion chamber heating means of this invention is located in an opening between the two halves of the box that encloses the regenerative beds. Temperature sensors are used to trigger the regeneration cycle.

The use of free flames to combust VOC's is in many cases unsatisfactory. For example, standard combustors are particularly undesirable when dealing with chlorinated hydrocarbons. A free flame also results, in some instances, in incomplete combustion and uncontrollable production of undesirable side products. Because combustors typically operate at flame temperatures on the order of 3500° F, significant amounts of unwanted $NO_x$ are often produced. Nitrous oxide ($N_2O$) and ammonia ($NH_3$) are often by-products of $NO_x$ removal techniques.

It can be seen that there is a need for a practical means of removing VOC's that are emitted from pumps, compressors, valves, and other fugitive sources that avoids the various difficulties and inefficiencies of the prior art. There is a need for such a system that will result in high destruction and removal efficiency (DRE) of the VOC's while handling a broad range of VOC's in a cost-effective manner. In particular, there is a need for a means to remove VOC's from fugitive sources having small flow rates per unit and that does not utilize multiple beds or direct flame.

SUMMARY OF THE INVENTION

The present invention is directed to a method and apparatus for the detection and/or abatement of fugitive VOC emissions. To this end, localized VOC abatement systems are installed on sources of fugitive VOC emissions, such as individual pumps or clusters of pumps. Suction, generated by a fume pump or a venturi type ejector, pulls air and VOC's from the source housings into a knock-out pot where any liquid is removed. The VOC fumes then flow to a flameless combustor/thermal oxidizer comprising a tube packed with a destruction matrix and surrounded by an electric heater and thermal insulation.

The destruction matrix is composed of inert ceramic materials that enhance process mixing and provide thermal inertia for process stability. Such a destruction matrix is designed to produce DRE's of greater than 99.99%, with less than 10 ppmV CO and less than 12 ppmV $NO_x$. In sequence with the destruction matrix is a convective quench tube. The thermal oxidizer/destruction matrix is designed to operate in a flameless manner at temperatures of 1550°–1800° F.

The appropriate conversion may be obtained at lower temperatures and residence times than those required in a conventional incinerator. There is also inherent safety in the use of a process in which there are no open flames, and in which the mixture of gases to be introduced into the matrix is relatively cool, outside the flammability limits of the constituents, and, therefore, not explosive under ambient conditions. Problems of flameouts are avoided. Moreover, from a practical viewpoint, all of these features will most likely result in the ability to obtain required government permitting much more easily.

Accordingly, it is an object of the present invention to provide a method and apparatus capable of meeting existing regulations for the destruction of fugitive VOC emissions.

It is another object of the present invention to provide a method and apparatus for the minimization of $NO_x$ combustion by-products of VOC abatement to levels below those achievable by conventional combustion technologies such as premixed, nozzle-mixed, or staged burners, or by $NO_x$ removal processes such as Thermal De-$NO_x$ (U.S. Pat. No. 3,900,554 (Lyon)), Selective Catalytic Reduction, or Rap-Re-$NO_x$.

Other objects of this invention include providing for the safe operation of such an apparatus and that such apparatus require minimal maintenance and capital expenditure. Other and further objects and advantages will appear hereinafter.

DETAILED DESCRIPTION OF THE PREFERRED EMBODIMENTS

In practice, the option of capturing emissions in enclosures and sending them to disposal facilities, such as fume incinerators, is rarely chosen because of the high cost for manifolding and piping the source vents from each pipe to a remote central treatment area. A potentially more attractive solution would be to install local VOC abatement systems on individual pumps or clusters of pumps. Until the present invention, no such system existed.

Further, an ideal system capable of meeting industry needs would require: (1) safe operation—meeting Class I, Division II industry safety standards; (2) reliability—continually destroying VOC's with minimal maintenance; (3) regulatory compliance—meeting BACT standards; (4) flexibility—handling numerous VOC's without being poisoned; (5) retrofitability—replacing existing hardware with a minimum downtime; and (6) low cost. The method and apparatus of the present invention meets each of these requirements.

Figure 1:
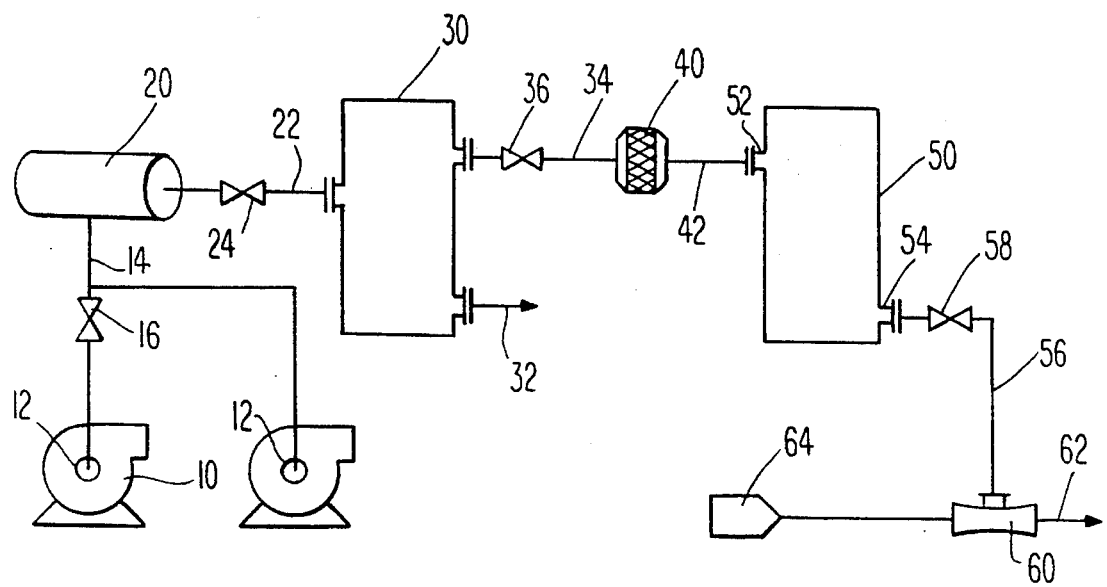
FIG. 1 is a schematic representation of one embodiment of the present invention utilizing a flame arrestor and a venturi type ejector.

Turning in detail to the drawings, where like numbers designate like components, Fig. 1 illustrates schematically a preferred embodiment of the present invention. A pump (10) having a mechanical seal (12) is fitted such that any VOC emissions from that mechanical seal (12) are collected in a VOC emission stream (14). Note that, while the term "pump" is used herein, the present invention applies equally as well to valves, compressors, or any other device that utilizes mechanical seals having a tendency to leak VOC emissions.

Typically, each of the pumps (10) will have been fitted with a single mechanical seal (12). A means will be provided for collecting leaks from these seals and the collected gases will be manifolded into the common collection header (20). A venturi type ejector, such as a vacuum eductor (60) or, alternatively, a small electric diaphragm pump, will draw a slight vacuum on the entire system. This positive air purge will sweep any fugitive VOC emissions from the pump seals (12) into the VOC abatement system for destruction. Suction of the order of −1.0" w.c. and 5.0 scfh is sufficient to reduce measured VOC concentrations of high performance, single mechanical seals from greater than 10,000 ppmV to around 10–18 ppmV.

While only two pumps are depicted in FIG. 1, a plurality of mechanical seals (12) from a plurality of pumps (10) can be simultaneously collected into a single collection header (20). Preferably, an apparatus according to the present invention is designed to process the flow from as few as one, or as many as twelve pumps (10) that are manifolded together, into the collection header (20). Each VOC emission stream (14) may have an appropriate valve (16) so that individual streams can be isolated if necessary.

Having been accumulated in the collection header (20), the collected VOC stream (22) is typically routed to a knock-out pot (30). (Optionally, an additional isolation valve (24) can be provided.) The knock-pot (30) is designed to accept liquid from the pumps (10) in the event of a catastrophic leak occurrence. Liquids are removed from knock-out pot (30) via liquid drain (32). The gaseous VOC stream (34) then flows through a fail-closed shut-off valve (36) that operates in conjunction with a high level switch in the knock-out pot (30) that will block off all downstream flow in the event that a catastrophic leak occurs.

After the knock-out pot (30) has removed any residual liquid, the gaseous VOC stream (34) is preferably passed through a flame arrestor (40), thereafter entering the flameless combustor (50) via combustor inlet (52) as combustor input stream (42). The flame arrestor (40) serves as a passive safety, backup device to preclude any flashback from the flameless combustor (50) into the collection header (20).

Significant research into the phenomena of combustion within porous inert media (PIM) has recently been undertaken. Because PIM combustion can occur outside the normal premixed fueled/air flammability limits, the technology can be called "flameless." In this regard U.S. Pat. Nos. 4,688,495 (Galloway) and 4,823,711 (Kroneberger et al.) disclose early work on matrix combustion technology. In addition, U.S. Pat. No. 5,165,884 (Martin et al.), along with U.S. Pat. No. 5,320,518 (Martin et al.) discuss in significant detail the technology involved in flameless combustor (50). The issued Martin et al. patent, along with the Galloway and Kroneberger et al. patents are hereby incorporated herein by reference.

Figure 3:
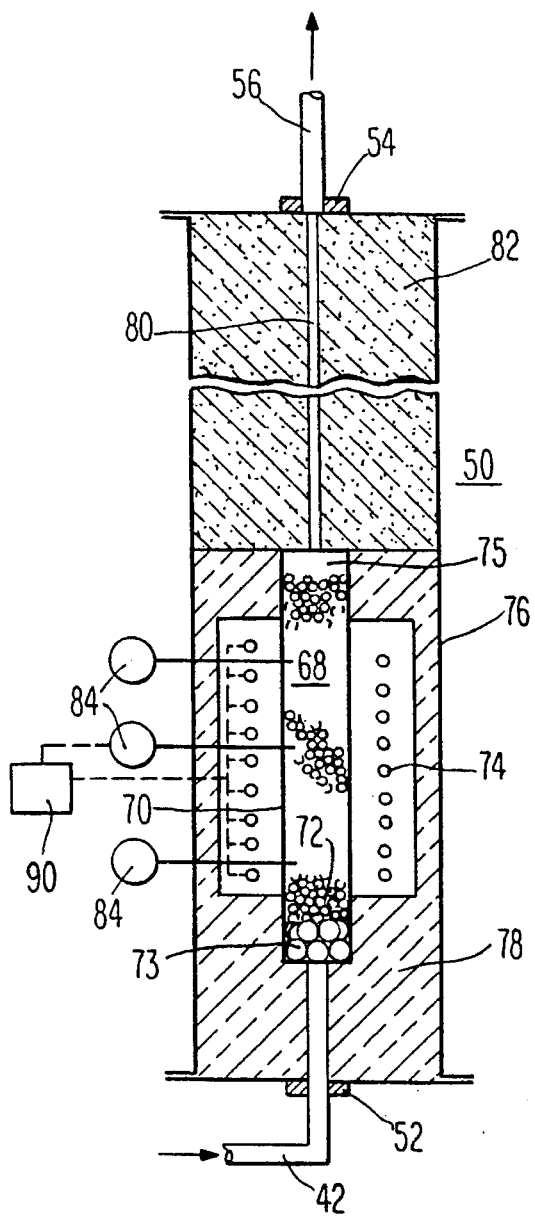
FIG. 3 is a cross-sectional schematic of an embodiment of the flameless combustor of the present invention incorporating a convective quench section.
Figure 4:
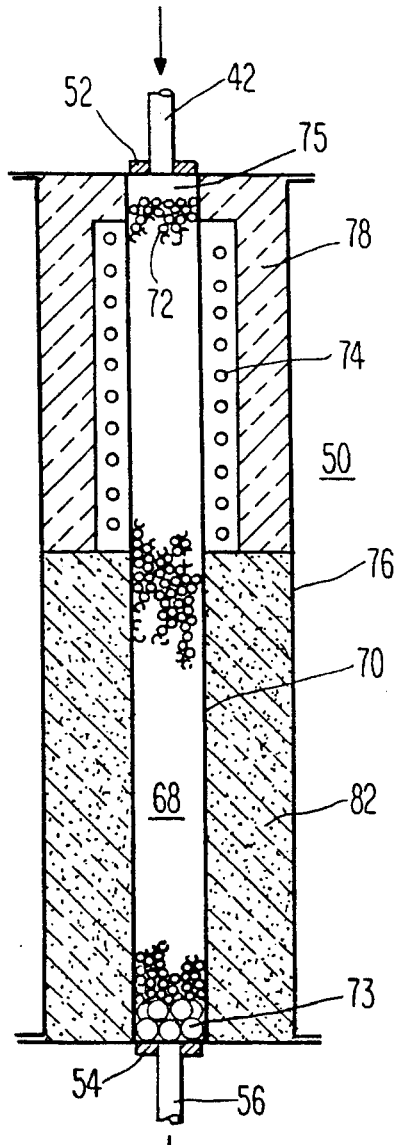
FIG. 4 is a cross-sectional schematic diagram of an alternative embodiment of the flameless combustor of the present invention incorporating a convective quench section.

Two embodiments of a flameless combustor (50) are disclosed in FIGS. 3 and 4. Typically, the flameless combustor (50) will consist of a high-alloy matrix bed containment shell (70) that is filled with a quantity of heat resistant material (72) so as to create a matrix bed (68). The containment shell (70) will preferably be of sufficient mechanical strength to prevent rupture even in the event of a detonation generating significant pressures. Heating elements (74), which are preferably electric, surround this inner containment shell (70) and are capable of providing the system with preheating and proper temperature maintenance during operation.

The entire thermal oxidation assembly will be mounted in an outer containment shell (76), preferably made of carbon steel. This outer containment shell (76) is preferably lined with high temperature insulation (78) in the entirety of the region of the matrix bed containment shell (70). In the region of the matrix bed containment shell (70), this combustor insulation (78) will preferably minimize heat loss to the environment, while ensuring that all exposed surfaces remain below those temperatures acceptable for a Class I, Division 2, Group D area. (The National Electrical Code categorizes locations by class, division, and group, depending upon the properties of the flammable vapors, liquids, or gases that may be present and the likelihood that a flammable or combustible concentration or quantity is present. The Code requires that the surface temperature of any exposed surfaces be below the ignition temperature of the relevant gas or vapor. In this instance, that would require something less than 280° C (536° F).)

Upon entering the flameless combustor (50), the fugitive VOC emissions will be raised to oxidation temperatures of 1400°–3500° F. (760°–1925° C.), and preferably 1550°–1800° F. (845°–980° C.), by the heat input from the heating elements (74). The fugitive VOC emissions are then maintained at these temperatures for a sufficient residence time to ensure substantially complete destruction. In normal operation, it is contemplated that this residence time will be less than 2.0 seconds, and preferably less than 0.5 seconds.

In one preferred configuration, the heating elements (74) around the matrix bed (68) may be grouped into two sets, one set making up an electrical preheater section that raises the temperature of the gases to the autoignition point and allows them to react, and a second set making up a residence time section where the heating elements (74) are adjusted so as to just offset the ambient losses and allow the reacted gases to complete oxidation at temperature.

The result of this heating is the creation of a flameless combustion wave within the matrix bed (68) whereby the VOC compounds are ignited and oxidized to stable products, such as water and carbon dioxide. The combustion wave is observed as a steep increase in bed temperature from ambient temperature on the inlet side of the wave to approximately the adiabatic combustion temperature of the mixture on the outlet side of the wave. This rapid change takes place over a distance of usually several inches in a typical combustor, with the actual distance being dependent upon feed concentrations, feed rates, gas velocity distribution, bed material, and bed physical properties, type of specific feed materials, etc. Heat losses in the direction of flow also will have an effect on the length of the combustion wave.

The temperature of the combustion is dependent upon feed concentrations, feed rates, gas velocity distribution, bed physical properties, type of specific feed materials, heat losses, heat input from the heaters, etc.

After thorough destruction in the flameless combustor (50), the resulting gaseous products (56) will exit the flameless combustor through combustor outlet (54) and pass through isolation valve (58). In the embodiment of FIG. 1, these gaseous products (56) are entrained into a stream of plant air (64) in eductor (60) and are thereafter exhausted in an exhaust stream (62).

Figure 2:
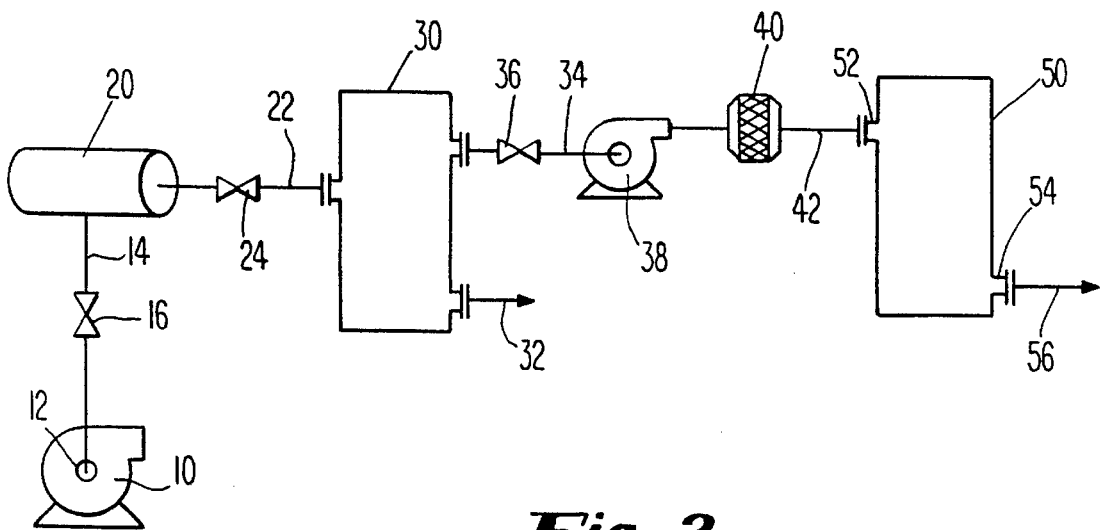
FIG. 2 is an alternative embodiment of the present invention utilizing a pre-combustor pump.

In the alternative embodiment of FIG. 2, a pump (38) is located between the knock-out pot (30) and the flame arrestor (40), serving the same general function as the eductor (60) of the embodiment of FIG. 1. It is generally preferable to use the venturi type ejector embodiment of FIG. 1 because it is low in capital cost, it further reduces the exhaust temperature by mixing 3–5 parts ambient air with the hot exhaust, it has no moving parts and, thus, requires almost no maintenance, it will draw a large vacuum of several psig over a wide turndown, and, if it is installed on the tail end of the system, the combustor (50) will be under vacuum, which will ensure that all leaks are inward. The disadvantages of eductors are the continuous operating cost of the high pressure air needed to run the eductor, and the reactor is operating under a vacuum and, as such, the residence time is lower due to the pressure-related lower density of the oxidized exhaust gases. In other words, the pump is higher in capital cost, but lower in operating cost.

In most cases, any VOC abatement system will be required to meet the standards for electrical classification. In such events, the outlet temperature of the gaseous products (56) will need to be reduced from the temperatures generated in the matrix bed (68). If there is such a need to reduce the temperature of the combustion products, the gaseous products stream are preferably passed through a convective quench section prior to leaving the flameless combustor (50), as is illustrated in both FIGS. 3 and 4. This convective quench unit will remove heat in a controlled manner while maintaining all exposed exterior surfaces below the temperature limitations for Class I, Division 2 areas.

In the embodiment of FIG. 3, the matrix bed containment shell (70) terminates at the end of the combustion phase. Thereafter, a convective quench stream (80) passes through a length of convective quench insulation (82) before exhausting in gaseous products stream (56). The convective quench insulation (82) differs from the combustor insulation (78) in that it has a different heat conductivity. The combustor insulation (78) is designed to have low heat conductivity so as to minimize heat losses from the matrix bed (68). The convective quench insulation (82), on the other hand, has a slightly higher heat conductivity, designed to ensure sufficient heat loss from the exhaust stream so as to drop the outlet temperature to below that suitable for a Class I, Division 2 area while still maintaining sufficient insulation to also keep the skin temperature of the flameless combustor (50) below that suitable for the same Class I, Division 2 areas.

As a further alternative, shown in FIG. 4, the matrix bed (68) can be extended through the convective quench region to the combustor outlet (54). The convective quench section of this matrix bed (68) is not surrounded by heating elements (74) and will be downstream of the combustion wave that will be created in the region of the heating elements (74). In this embodiment, the convective quench is based on a variety of heat exchange devices: forced convection from the gas to the matrix bed containment shell (70), forced convection from the gas to the heat resistant material (72), radiation from the heat resistant material (72) to the matrix bed containment shell (70), conduction across the matrix bed containment shell (70), radiation from the matrix bed containment shell (70) to the convective quench insulation (82), conduction across the convective quench insulation (82), conduction across the outer containment shell (76), and radiation, natural convection, and forced convection from the outer containment shell (76) to the ambient environment.

In an unpacked convective quench section, the heat transfer mechanism lacks the forced convection from the gases to the heat resistant material (72), and subsequent radiation from the heat resistant material (72) to the matrix bed containment shell (70), but rather simply has forced convection from the gases to the matrix bed containment shell (70).

Both FIGS. 1 and 2 indicate that the combustor input stream (42) enters the flameless combustor (50) at the top and that the gaseous products (56) exit the flameless combustor (50) at the bottom. FIG. 4 also shows this configuration, while FIG. 3 indicates an opposite configuration, i.e., the combustor input stream (42) enters the flameless combustor (50) at the bottom and the gaseous products (56) exit at the top. The present invention will operate in either configuration. Given the current sizing of such flameless combustor units, however, it is believed that the top down configuration is preferable to allow for ease of access to the heating elements (74). This is advantageous because it is believed that the only significant components that will require regular maintenance in the apparatus of the present invention are the heating elements (74) and the matrix bed containment shell (70). Thus, for example, the matrix bed containment shell (70) can constitute a cartridge that can be removed from the flameless combustor (50) as a unit for maintenance purposes.

There will typically, but not necessarily, be a plenum (73), preferably made of a heat-resistant material such as a layer or two of larger diameter ceramic balls or a perforated plate, at the bottom of the matrix bed (68) to prevent the heat resistent material (72) from entering the piping below the matrix bed (68). If the flow pattern is set up such that the combustor input stream (42) enters the flameless combustor (50) at the bottom, this plenum (73) will act to evenly distribute incoming gases and further mix these gases prior to entering the matrix bed (68). It is believed that this helps to achieve a relatively flat cross-sectional profile of the combustion wave perpendicular to the direction of the flow of the gases through the matrix bed (68). In some instances the plenum (73) may be desirable to achieve the flatness of the cross-section of the wave, depending on the configuration of the matrix bed (68).

If the flow pattern is set up such that the combustor input stream (42) enters the flameless combustor (50) at the top, the plenum function of distributing the gases will be achieved through the use of a void space (75) over the top of the matrix bed (68). This void space (75) will preferably be present regardless of whether the flow pattern is top to bottom or bottom to top to allow for any expansion of the heat resistant material (72) contained in the matrix bed (68).

If a plenum of brick or ceramic balls is used, it will typically comprise a section with very low radial pressure drop, so that cross-sectional gas distribution is maximized. Convenient means for mixing the gases and/or oxygen prior to entering the matrix bed (68) may also be utilized, such as a venturi-type or twisted insert static gas-air mixer.

Thus, the basics of the preferred embodiments of the present invention have been disclosed. Many variations on, and additions to, these basic embodiments are also possible.

Typically, the flameless combustor (50) will contain various temperature sensors (84) to detect unacceptably high or low temperatures and thereby control the heating elements (74). Preferably, if excessively high temperatures exit the flameless combustor (50), a thermal safety valve will fail and close to shut off all flow. Preferably, the valve will be located upstream of the flameless combustor (50) but downstream of the flame arrestor (40) in order to provide for passive shutdown of the system in the case of a deflagration phenomenon backpropagating into the fume inlet line.

Also typically, the entire system will be sequenced and operated by a locally mounted control system, which will provide sequencing, control, and safety monitoring. The control system will (90) receive analog and digital inputs from several instruments mounted in the system, including thermocouples and level switches. It will control flameless combustor temperatures during the preheat and operation steps by modulating current to the electric heating elements (74) to provide for a controlled system heatup and for maintenance of oxidation temperature at destruction set points. It will also continuously monitor all system safety interlocks and will shut the system down in a safe manner upon detection of a tripped interlock.

In one preferred embodiment of the present invention, the temperature sensors (84), or a means of monitoring the power consumed by the heating elements (74), can be used as a means to monitor the amount of VOC's leaking from the pump seals (12). Because any change in the amount of fugitive emissions being sent to the flameless combustor (50) will result in an increase or decrease in the amount of enthalpy of the fume stream entering the combustion system, it will also result in a change in either: (1) the amount of power consumed by the heating elements (74) to maintain a particular temperature profile in the matrix bed (68); or (2) the temperature of the matrix bed (68) if the power remains constant. This changing temperature profile or changing power consumption curve can be used to signal the operator of a change in inlet VOC's. This is particularly advantageous in recognizing deviations from the normal range of pump seal leakage.

It may be preferable to have a single flameless combustor (50) dedicated to a single pump seal (12) for two reasons. In such a configuration, if a pump seal (12) fails, identification of the failure is straightforward, relative to centralized facilities, assuming that there are local alarms on the flameless combustor (50) and/or the knock-out pot (30). More importantly, fire and explosion hazards are diminished greatly because of the minimization of quantities of fume piping from the pump seals (12) to the combustor (50) that could contain flammable mixtures.

The types of matrix materials used should have high heat conductance by radiation, convection, and conduction. The heat transfer properties of the system are also dependent on the ratio of radiative to convective heat-transfer.

The matrix bed (68) may be sized for any desired flow stream by altering the matrix flow cross-section, height, material, void fraction, outlet temperature, and supplemental heat addition, if desired. Preferred matrix materials are ceramic balls, but other bed materials and configurations may be used, including, but not limited to, other random ceramic packings such as saddles or pall rings, structured ceramic packing, ceramic or metal foam, metal or ceramic wool and the like.

Generally, for combustion of hydrocarbon gases, the ceramic balls are useful if they have a diameter from about 0.0625 to 3 inches (0.159–7.62 cm), preferably about ¾ inch (1.9 cm). Another useful configuration is the use of random ceramic saddles typically from 0.0625 to 3 inch (0.159–7.62 cm) nominal size, preferably about ½ to 1.5 inches (1.27–3.81 cm) nominal size. Other useful packing materials are pall rings and rashig rings with diameters from about 0.0625 to 3 inches (0.159–7.62 cm), and preferably from about 0.5 to 1.5 inches (1.27–3.81 cm).

A ceramic foam material may also be utilized. Typical foam material may be utilized that has a void fraction of 10 to 99%, preferably 75 to 95%, and most preferably about 90%. The pore sizes in any preferred ceramic foam material will be about 0.1 to 1,000 pores per inch (0.04 to 400 pores per cm), preferably about 1 to 100 pores per inch (0.4 to 40 pores per cm), and most preferably about 10 to 30 pores per inch (4 to 12 pores per cm).

Other shapes of ceramic material may be utilized such as honeycomb shape ceramic. Instead of a ceramic, the heat-resistant matter used to form the bed may also be a metal, which may be randomly packed or may have a structured packing.

Generally, the void fraction of the matrix bed will be between 0.3 and 0.9. In addition, the material in the matrix bed will typically have a specific surface area ranging from 40 $m^2/m^3$ to 1040 $m^2/m^3$.

As a result of the laminar and plug flow characteristics of this process, and the good distribution of heat resulting from the intra-matrix surface radiation coupled with surface convection, the combustion of the VOC's is more complete than flame combustion. According to the present invention, the VOC's are also heated by heat generated by the reaction, further increasing the completeness of the reaction.

For purposes of this discussion, means for extracting heat from a gas by convection and transferring that heat by radiation will be referred to as a "radiatively-coupled fin." A conventional fin enhances heat transfer from a fluid to a tube by providing additional surface area for convection, and conducting the additional heat to the tube. The matrix acts locally as a radiatively-coupled fin by enhancing convection with the gases and transferring this heat by radiation.

The radiative heat transfer within the matrix bed (68), the matrix bed containment shell (70), and the gas molecules within the flameless combustor (50) themselves are also important features of the operation of the apparatus and the method of the present invention. Therefore, the types of materials in the matrix bed (68) may be varied so that the inner body heat transfer characteristics, the radiative characteristics, the forced convective characteristics, and the inner matrix solids thermally conductive characteristics may be controlled within the bed. This may be done by varying the radiative heat transfer characteristics of the matrix bed (68) by using different sizes of heat resistant materials (72) to change the mean free radiative path or varying the emissivity of these materials, varying the forced convection heat transfer characteristics of the matrix bed (68) by varying its surface area per unit volume, or geometry, varying the thermally conductive heat transfer characteristics of the matrix bed (68) by using heat resistant materials (72) with different thermal conductivities, or changing the point to point surface contact area of the materials in the bed. These properties may be varied either concurrently or discretely to achieve a desired effect.

In addition to changing the properties of the matrix bed (68) itself, an interface, or several interfaces, can be introduced into the bed where one or more of the heat transfer properties of the bed are discretely or concurrently changed on either side of the interface and wherein this variation serves to help stabilize the wave in that location and acts as a "combustion wave anchor." This may be done, for example, by introducing an interface where void fractions change across the interface within the matrix bed (68). The interface may change the mean free radiative path across the interface independent of the void fraction. By changing heat resistant materials (72), the emissivity may change across the interface within the matrix bed (68). Changing the area per unit volume of the heat resistant materials (72) across an interface, the forced convective heat transfer characteristics may change as the gas is passed across the interface.

The matrix bed cross-section perpendicular to the flow axis may be configured in a circular, square, rectangular, or other geometry. The area of the cross-section may be intentionally varied (i.e., as a truncated cone or truncated pyramid) to achieve a wide stable range of reactant volumetric flowrates at each given matrix burning velocity.

In a typical system according to the present invention, the DRE of VOC's has been shown to be greater than 99.99%. Because the present invention typically operates at temperatures (1550°–1850° F) significantly below those present in standard combustors (about 3500° F), there is less production of the undesirable $NO_x$ by-products.

Further, the burning velocity of the reactant gases in the matrix has been observed to be as much as 2 to 10 times greater than the fastest known laminar flame speed in free air.

A principal advantage of the present invention is that, as a result of eliminating the need for an open flame, the present invention avoids the problems of explosivity and flame-outs. Furthermore, lack of flame will enable the user to obtain government permitting more easily, a significant advantage when dealing with today's stringent regulations.

While the present invention contemplates the use of heat resistant bed materials (72) without catalysts, a combined inert bed and catalyst may be used to enhance process characteristics such as reaction rate, if so desired. Catalyst could be impregnated onto the heat resistant materials (72) to alter the oxidation properties. Use of a catalyst may allow for the use of lower operating temperatures.

The units described above may be used without additional components for streams containing hydrocarbons, oxygenated hydrocarbons, or ppmv levels of nitrogen-, sulphur-, or halogen-containing hydrocarbons. The flameless combustor (50) also can effectively destroy nitrogenated, sulphonated, and halogenated compounds in higher concentrations, but an installed system may require post-treatment (such as scrubbing) to remove such products as HCl or $SO_2$.

There are several areas that will influence the cost effectiveness of the present inventive system compared to existing means of fugitive VOC abatement.

In certain areas, use of catalysts may serve to lower the cost of the system, while in other areas catalysts may increase system cost.

Preliminary estimates comparing the installed cost and year-long operating cost for a bank of eight 50 horsepower refinery pumps with alternative fugitive emission control technologies of: (1) the present inventive system without catalyst; (2) the present inventive system with catalyst; (3) replacing existing pumps with magnetic drive pumps; and (4) replacing existing pumps seals with double mechanical seals have shown the present invention to be significantly more cost effective. Rough estimates indicate that the installed cost of the present invention would be approximately 4% of the cost of replacing the eight existing pumps with magnetic drive pumps and about one tenth the cost of replacing all of the existing pump seals with double mechanical seals. Further, the incremental operating cost for the apparatus of the present invention would be only about 2–6% of the incremental cost of using magnetic drive pumps, and about 12–22% of the incremental cost of using double mechanical seals.

When compared to the prior art, the present invention has a unique combination of advantages. As compared to the regenerative style thermal oxidizers, the present invention uses a straightthrough style that results in higher DRE's and allows for the handling of a broader range of organics loading. The use of electric supplemental heat directed into the matrix bed (68) itself in a highly efficient radiation fashion, and forced convection being the primary heat transfer means put in the matrix, allow for maximum heat transfer at minimum pressure drop. The use of a packed convective quench section is a highly efficient means of removing heat from the gaseous products (56).

Further, the methods and apparatus of the present invention can be readily downsized for use with the small flow rates necessary to abate the fugitive VOC emissions from mechanical seals. Thus, the maximum capacity of a typical design of the present invention is 1.0 scfm (12 pumps at 5 scfh each). (Of course, the present invention could also easily be scaled up to significantly higher flow rates.) Further, a typical unit of the present invention would weigh less than 2,000 pounds, and occupy less than 100 cubic feet.

In summary, apparatus and methods for abating fugitive VOC emissions using an efficient collection and flameless combustion system have been described. The combustion temperature and residence times in the present combustor are lower than those of a conventional incinerator, thereby providing a high conversion of reactants to products with a minimum of unwanted by-products such as $NO_x$.

The present invention has been described in terms of several preferred embodiments. However, the invention is not limited to the embodiments depicted and described, but can have many variations within the spirit of the invention. For instance, the matrix materials (72) can have a distribution of characteristic length scales; the flow of reactants to the matrix bed (68) may be controlled by a microprocessor that monitors temperatures within the matrix bed (68); or the matrix bed (68) may contain a catalyst for the reaction.

In addition, the present invention could be used for processing any type of small flows, such as off of a laboratory pilot scale plant. The concepts of the present invention can also readily be adapted for use with higher flowrates.

Accordingly, the scope of the invention should be determined not by the embodiments illustrated, but rather by the appended claims and their legal equivalents. Having thus described the invention, what is desired to be protected by Letters Patent is presented by the following appended claims.

What is claimed is:

1. An apparatus for abating gaseous VOC leaks consisting essentially of:

a collection header connected to one or more sources of VOC's;

a flameless combustor having:
 (a) an inlet for receiving VOC's from the collection header;
 (b) an outlet for reaction gaseous products; and
 (c) a VOC oxidation section located between the inlet and the outlet including a matrix bed of heat resistant material, provided that said heat resistant material does not include oxidative catalytic material;

a convective quench section located between the portion of the oxidation section that is heated by the heater and the outlet, said convective quench section comprising a bed of heat resistant material, said convective quench section having a higher heat conductivity to the surrounding environment than the VOC oxidation section;

a knock-out pot located between the collection header and the flameless combustor;

a flame arrestor located between the collection header and the flameless combustor;

one or more temperature sensors for sensing the temperature of the matrix bed within the oxidation section;

an electric heater for heating at least a portion of the oxidation section including a portion of the matrix bed of heat resistant material to a temperature exceeding the decomposition temperature of the VOC's; and a means for creating a flow of about 1 standard cubic feet per minute or less from the one or more sources of VOC's to the inlet of the flameless combustor and subsequently through the flameless combustor.

2. The apparatus of claim 1 further comprising:

temperature sensing means for monitoring the temperature of the matrix bed materials in the oxidation section; and control means for receiving temperature inputs from the temperature sensing means and for controlling the amount of heat supplied by the heater.

3. A method for abating VOC emissions comprising the steps of:

(a) collecting VOC's from one or more sources of VOC's;

(b) heating a first portion of a matrix bed of heat resistant material within a flameless combustor above the autoignition temperature of the VOC's using an electric heater surrounding at least a portion of the matrix bed;

(c) removing liquids from the collected VOC's;

(d) feeding the VOC's through the first portion of the matrix bed by use of a pump or venturi type ejector, whereby the VOC's are combusted into gaseous products in a combustion wave;

(e) monitoring the temperature of the matrix bed and controlling the amount of heat added to the first portion of the matrix bed in response thereto so as to maintain the temperature of the first portion of the matrix bed between about 1400° F (760° C) and about 3500° F (1925° C); and (f) convectively quenching the gaseous products in a second portion of the matrix bed of heat resistant material prior to directing such gaseous products to a flameless combustor outlet, wherein the flow of the VOC's through the matrix bed of heat resistant material is uni-directional.

4. The method of claim 3 wherein the heat resistant material in the first portion of the matrix bed consists of noncatalytic oxidative material.

5. An apparatus comprising: collection means connected to the one or more sources of VOC's for collecting said VOC's;

a flameless combustor comprising
  (a) an inlet for receiving VOC's from the collection means;
  (b) an outlet for reaction gaseous products; and
  (c) a VOC oxidation section between the inlet and the outlet comprising a matrix bed of heat resistant material, provided that said heat resistant material does not include oxidative catalytic material; heating means for heating at least a portion of the oxidation section including a portion of the matrix bed to a temperature exceeding the decomposition temperature of the VOC's;

a convective quench section in flow communication with the portion of the oxidation section that is heated by the heating means, said convective quench section comprising a bed of heat resistant material; and means for creating a uni-directional flow from the one or more sources of VOC's to the inlet of the flameless combustor and through the flameless combustor, wherein said flow creation means is in flow communication with said outlet only by way of said flameless combustor.

6. The apparatus of claim 5 further comprising liquid removal means located between the collection means and the flameless combustor.

7. The apparatus of claim 5 wherein the heat resistant material comprises ceramic balls, ceramic saddles, ceramic pall rings, ceramic rashig rings, ceramic foam, ceramic wool, metal foam, or metal wool.

8. The apparatus of claim 5 further comprising:
  a first insulation surrounding the portion of the oxidation section that is heated by the heater; and
  a second insulation surrounding a portion of the convective quench section, wherein the second insulation has a higher heat conductivity than the first insulation.

9. The apparatus of claim 5 further comprising:
  temperature sensing means for monitoring the temperature of the matrix bed materials in the oxidation section; and
  control means for receiving temperature inputs from the temperature sensing means and for controlling the amount of heat supplied by the heater.

10. An apparatus for abating gaseous VOC leaks consisting essentially of:
  a collection header connected to one or more sources of VOC's;
  a flameless combustor having:
    (a) an inlet for receiving VOC's from the collection header;
    (b) an outlet for removing reaction gaseous products from the flameless combustor; and
    (c) a gaseous VOC oxidation section located between the inlet and the outlet comprising a matrix bed of heat resistant material, provided that said heat resistant material does not include oxidative catalytic material;
  a heater for heating at least a portion of the oxidation section including a portion of the matrix bed of heat resistant material to a temperature exceeding the decomposition temperature of the VOC's;
  a convective quench section in flow communication with the portion of the oxidation section that is heated by the heater, said convective quench section comprising a bed of heat resistant material; and
  a means for creating a uni-directional flow from the one or more sources of VOC's through the inlet of the flameless combustor and subsequently through the outlet of the flameless combustor.

11. The apparatus of claim 10 further comprising a knock-out pot located between the collection header and the flameless combustor for removal of liquids from the flow.

12. The apparatus of claim 11 further comprising a shut-off valve between the knock-out pot and the flameless combustor for closing off the flameless combustor if a significant amount of liquid passes through the knock-out pot.

13. The apparatus of claim 10 further comprising a flame arrestor located between the collection header and the flameless combustor.

14. The apparatus of claim 10 wherein the means for creating flow is a pump located between the collection header and the flameless combustor.

15. The apparatus of claim 10 wherein the means for creating flow is a venturi type ejector connected to the outlet of the flameless combustor.

16. The apparatus of claim 10 wherein the heater is electric.

17. The apparatus of claim 10 wherein the heat resistant material comprises ceramic balls, ceramic saddles, ceramic pall rings, ceramic rashig rings, ceramic foam, ceramic wool, metal foam, or metal wool.

18. The apparatus of claim 10 wherein the heat resistant material has a specific surface area from 40 $m^2/m^3$ to 1040 $m^2/m^3$.

19. The apparatus of claim 10 wherein the one or more sources of VOC's are mechanical seals.

20. The apparatus of claim 10 further comprising one or more temperature sensors for sensing the temperature of the matrix bed.

21. The apparatus of claim 10 further comprising:
  a first insulation surrounding the portion of the oxidation section that is heated by the heater; and
  a second insulation surrounding a portion of the convective quench section, wherein the second insulation has a higher heat conductivity than the first insulation.

22. The apparatus of claim 10 further comprising:
  temperature sensing means for monitoring the temperature of the matrix bed materials in the oxidation section; and
  control means for receiving temperature inputs from the temperature sensing means and for controlling the amount of heat supplied by the heater.

23. A method for abating VOC emissions comprising the steps of:
  (a) collecting VOC's from one or more sources of VOC's;
  (b) heating a first portion of a matrix bed of heat resistant material within a flameless combustor to a temperature of at least 1400° F (760° C);
  (c) feeding the VOC's through the first portion of the matrix bed, whereby the VOC's are combusted into gaseous products in a combustion wave;
  (d) convectively quenching the gaseous products in a second portion of the matrix bed of heat resistant material; and
  (e) directing such gaseous products to a flameless combustor outlet,
  wherein the flow of the VOC's through the matrix bed of heat resistant material is uni-directional.

24. The method of claim 23 further comprising the step of removing liquids from the collected VOC's prior to feeding the VOC's through the matrix bed.

25. The method of claim 23 wherein the step of feeding the VOC's through the matrix bed is achieved using a pump or venturi type ejector.

26. The method of claim 23 wherein the step of heating the portion of the matrix bed of heat resistant material is achieved using an electric heater surrounding at least a portion of the matrix bed.

27. The method of claim 23 wherein the heat resistant material of the matrix bed comprises a catalyst.

28. The method of claim 23 wherein the one or more source from which the VOC's are collected are mechanical seals.

29. The method of claim 23 comprising the further steps of monitoring the temperature of the matrix bed and controlling the amount of heat added to the matrix bed in response thereto.

30. The method of claim 23 comprising the further step of monitoring changes in the amount of VOC's collected from the one or more sources of VOC's by monitoring any changes in the temperature of the matrix bed.

31. The method of claim 23 comprising the further step of monitoring changes in the amount of VOC's collected from the one or more sources of VOC's by monitoring any changes in the amount of heat added to maintain the matrix bed of heat resistant material above the autoignition temperature of the VOC's.

32. The method of claim 23 wherein the matrix bed temperature is maintained between about 1550° F. (845° C.) and about 1800° F. (980° C.) in the combustion wave.

33. The method of claim 23 wherein a destruction and removal efficiency of at least 99.99% is achieved.

34. The method of claim 23 wherein the gaseous products contain less than 18 ppmV VOC's.

35. The method of claim 23 wherein the matrix bed of heat resistant material consists of non-catalytic oxidative material.

36. An apparatus for abating gaseous VOC leaks comprising:
(a) a collection header connected to one or more sources of VOC's;
(b) a flameless thermal oxidizer having:
(i) an inlet for receiving VOC's from the collection header;
(ii) an outlet for removing gaseous reaction products from the flameless thermal oxidizer; and
(iii) a gaseous VOC oxidation section located between the inlet and the outlet comprising a matrix bed of heat resistant material;
(c) a heater for heating at least a portion of the oxidation section including a portion of the matrix bed of heat resistant material to a temperature exceeding the decomposition temperature of the VOC's;
(d) a convective quench section located between the portion of the oxidation section that is heated by the heater and the outlet, said convective quench section comprising a bed of heat resistant material;
(e) a means for creating a flow from the one or more sources of VOC's through the flameless combustor; and
(f) temperature sensing means for monitoring the temperature of the matrix bed materials in the oxidation section;
(g) control means for receiving temperature inputs from the temperature sensing means and for controlling the amount of heat supplied by the heater.

37. The apparatus of claim 36 further comprising a knock-out pot located between the collection header and the thermal oxidizer for removal of liquids from the flow.

38. The apparatus of claim 36 further comprising a shut-off valve between the knock-out pot and the thermal oxidizer for closing off the thermal oxidizer if a significant amount of liquid passes through the knock-out pot.

39. The apparatus of claim 36 further comprising a flame arrestor located between the collection header and the thermal oxidizer.

40. The apparatus of claim 36 wherein the means for creating flow is a pump located between the collection header and the thermal oxidizer.

41. The apparatus of claim 36 wherein the means for creating flow is a venturi type ejector connected to the outlet of the thermal oxidizer.

42. The apparatus of claim 36 wherein the heater is electric.

43. The apparatus of claim 36 wherein the heat resistant material comprises ceramic balls, ceramic saddles, ceramic pall rings, ceramic rashig rings, ceramic foam, ceramic wool, metal foam, or metal wool having a specific surface area from 40 $m^2/m^3$ to 1040 $m_2/m^3$.

44. The apparatus of claim 36 wherein the heat resistant material comprises a catalyst.

45. The apparatus of claim 36 further comprising one or more temperature sensors for sensing the temperature of the matrix bed in the oxidation section.

46. The apparatus of claim 36 further comprising:
a first insulation surrounding the portion of the oxidation section that is heated by the heater; and
a second insulation surrounding a portion of the convective quench section, wherein the second insulation has a higher heat conductivity than the first insulation.

* * * * *